United States Patent [19]
Kempen

[11] Patent Number: 6,004,614
[45] Date of Patent: Dec. 21, 1999

[54] DICARBOXYLIC ACIDS AS AN ANIMAL FEED INGREDIENT

[75] Inventor: Théo Van Kempen, Gif sur Yvette, France

[73] Assignee: Rhône-Poulenc Nutritiion Animale, Antony, France

[21] Appl. No.: 08/936,518

[22] Filed: Sep. 24, 1997

[30] Foreign Application Priority Data

Feb. 19, 1997 [EP] European Pat. Off. .............. 97400366

[51] Int. Cl.$^6$ ...................................................... A23K 1/00
[52] U.S. Cl. ............................................................ 426/635
[58] Field of Search ............................................... 426/635

[56] References Cited

U.S. PATENT DOCUMENTS 3,982,028 9/1976 Bellingham ................................ 426/69
4,109,019 8/1978 Moore ........................................ 426/69

*Primary Examiner*—Nathan M. Nutter
*Attorney, Agent, or Firm*—Finnegan, Henderson, Farabow, Garrett & Dunner, L.L.P.

[57] ABSTRACT

The invention describes a new use for dicarboxylic acids, dicarboxylic acid metabolites, and their derivatives as animal feed ingredients. Among the nature of dicarboxylic acids, those having 6, 8, or 10 carbon atoms are preferred and still more preferred is the adipic acid.

20 Claims, 1 Drawing Sheet

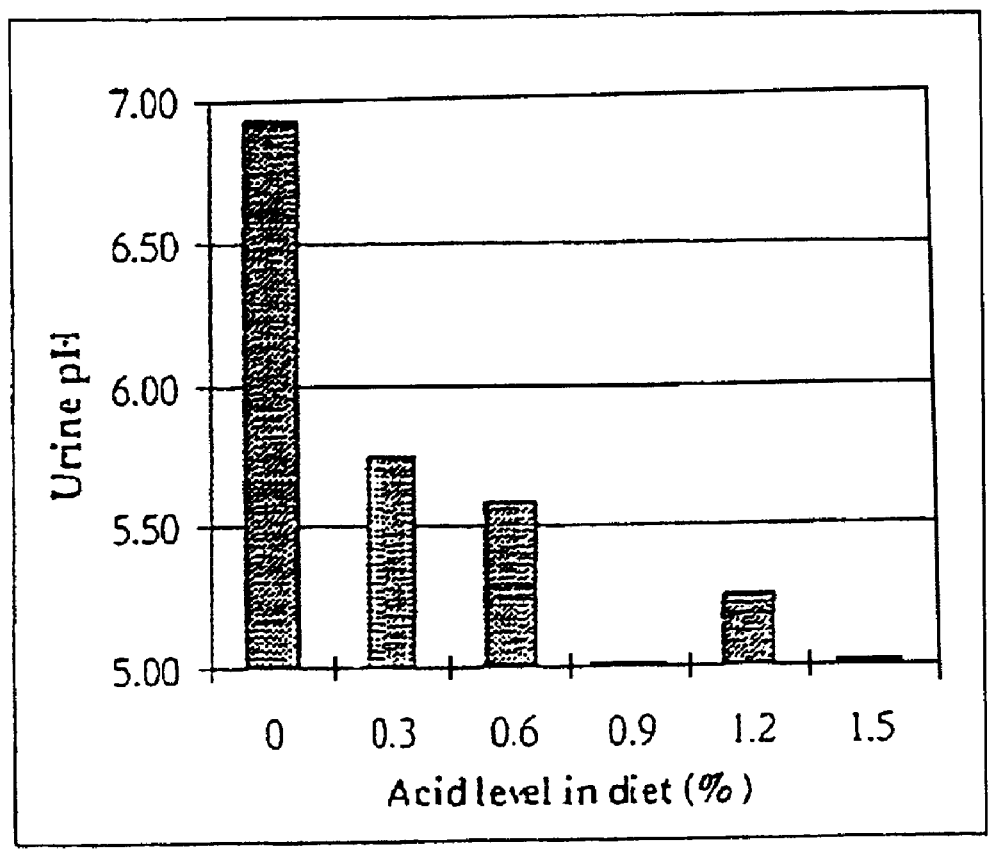
Figure 1: The effect of adipic acid in an animal diet on the animal's urine pH

DICARBOXYLIC ACIDS AS AN ANIMAL FEED INGREDIENT

The invention describes a new use for dicarboxylic acids, dicarboxylic acid metabolites, and their derivatives as animal feed ingredients. Among the nature of dicarboxylic acids, those having 6, 8, or 10 carbon atoms are preferred and still more Adipic acid is one of these dicarboxylic acids with the following chemical formula: $COOH-(CH_2)_4-COOH$. It is produced naturally in animals from fatty acids through a combination of β-oxidation and omega-oxidation, and can be catabolized to yield energy. This production is especially important in conditions when the free fatty acid concentration in cells is increased, such as when fatty acid catabolism is increased, beta-oxidation is inhibited, or when medium-chain fatty acids are provided in the diet as a significant source of energy. Since adipic acid is water-soluble, it can also be excreted in the urine (van Kempen & Odle, 1995).

Some investigations have led to the possibility to use adipic acid as an energy substrate for premature infants (Mingrone et al., 1992), indicating that the compound is safe for consumption. Results of these trials indeed indicated that a large portion of the adipic acid can be catabolized.

No applications for dicarboxylic acids as feed ingredients have been described until now, except as a feed preservative or as an energy source for premature infant. The present invention aims to a new application for animal feeds, including, but not limited to, feeds for farm animals such as fish, poultry, swine, and cattle.

The dicarboxylic acids, dicarboxylic acid metabolites, and derivatives may be used as interesting feed ingredients for animals since inclusion the feed:
- provides a source of energy
- aids in the control of micro-biological contaminants in feeds
- acidifies the feed which enhances growth performance and improves animal health
- aids in the control of undesirable micro-organisms in the intestinal tract
- reduces the animal's amino acid requirement. Lysine is spared to a major degree and arginine is spared to a major degree
- results in the acidification of animal waste (including, but not limited to, urine, feces, manure, and slurry), which decreases ammonia emission and reduces odor. In addition, the fertilization value of the animal waste remains more stable since its nitrogen content is less affected by losses.

The dicarboxylic acids can be chosen in the list of dicarboxylic acids bearing an even numbers of carbon atoms equal to or exceeding 6, preferably among adipic acid, suberic acid or sebacic acid. The most preferred dicarboxylic acid for economic reasons is adipic acid. Metabolites of the dicarboxylic acids can be chosen among the beta-hydroxy acids or the beta-keto acids (such as beta-hydroxy adipic acid and beta-keto adipic acid). Derivatives of the dicarboxylic acids or the dicarboxylic acid metabolites such as their alkali or alkali earth salts (such as sodium, potassium or calcium salts) or ammonium salt can also be used.

In animal diets, dicarboxylic acids, dicarboxylic acid metabolites, or their derivatives are included at a rate to supply 0.01 to 10 g of dicarboxylic acids/$kg^{075}$, preferably 0.2 to 1g dicarboxylic acids/$(day*kg^{0.75})$.

The objective of the following examples is to describe three trials in which adipic acid was evaluated as a potential feed ingredient.

BRIEF DESCRIPTION OF THE DRAWING

FIG. 1 demonstrates the effect of adipic acid in an animal diet on the animal's urine pH.

EXAMPLES

Materials and Methods

Three experiments were carried out to evaluate the effectiveness of adipic acid for the above indicated tasks. In trial one, 6 pigs (approximately 80 kg each; on which an ileal-rectal anastomosis had been performed) were used. These pigs were limit-fed a commercial diet (2 kg/day) supplemented with a vitamin-mineral premix as customary for ileal-rectal anastomosed pigs. This diet was supplemented with graded levels of adipic acids (0, 0.3, 0.6, 0.9, 1.2, or 1.5% (wt/wt)) such that each pig received one level of adipic acid in the diet (under the circumstances employed, an inclusion rate of 1.5% is approximately equivalent to 1.1 g adipic acid/ $(day*kg^{0.75})$.

The composition of the diet used in the trial was the following:

| | |
|---|---|
| Protein | 15.8% |
| Fat | 1.5% |
| Dig. Lysine | 0.79% |
| Dig. Methionine | 0.21% |
| Dig. Methionine + Cysteine | 0.47% |
| Dig. Threonine | 0.45% |
| Dig. Tyrosine | 0.15% | which corresponds to a diet containing the following ingredients:

| | |
|---|---|
| Wheat | 38.4% |
| Barley | 15.6% |
| Peas | 20.4% |
| Rapeseed meal | 4.6% |
| Sunflower meal | 6.0% |
| Wheat middlings | 10.4% |
| Molasses | 2.0% |
| Calcium carbonate | 1.05% |
| Bicalcium phosphate | 0.4% |
| Sodium salt | 0.4% |
| L-lysine | 0.25% |
| Premix | 0.5% |

The trial was carried out for a period of 5 days. Animal health was monitored, and urine was collected daily for the measurement of urinary pH. Blood samples were obtained on Day 4 for the determination of plasma free lysine and arginine using a Beckman amino acid analyzer.

In the second trial, two groups, each of 5 pigs, were used (approximately 50 kg at the start of the trial). One group served as a control, while the other group received the same commercial pig diet (see trial 1 for composition) as the pigs in group 1, but supplemented with 1% adipic acid (both diets were pelleted; the dose chosen provided approximately 1 g adipic acid/$(day*kg^{0.75})$). Feed was provided ad libitum. For a period of 4 weeks, performance was monitored on a weekly basis. On Day 21, blood samples were obtained for the determination of free lysine and arginine. During week 5, 8 pigs (4 per group) were placed in metabolism crates. After an adaptation period of 5 days, urine and feces were collected quantitatively for 2 days. The pH of these urine samples was measured upon collection. Subsequently, feces and urine were mixed to obtain manure, which was stored for a period of 4 weeks during which pH was monitored weekly following homogenization.

In the third trial, 6 non-lactating dairy cows were used. The animals ranged in weight from 680 to 750 kg, and were fed a mixture of 7 kg of hay and 2 kg of concentrate per day. The composition of the concentrate was as follows:

| | |
|---|---|
| Wheat | 41% |
| Sugarbeet pulp | 37% |
| Soybean meal | 15% |
| Urea | 2% |
| Molasses | 5% |

Since it was not practical to mix the adipic acid in the diet, adipic acid was administered (mixed in approximately 200 ml of water) twice daily for a period of 10 days at a rate of 50 g/animal/administration through a rumen canula, equivalent to a dose of approximately 0.7 g adipic acid/$kg^{0.75}$/day. Blood samples for plasma analysis of free lysine and arginine were obtained on Days −2, −1, (control), and on Days 6 and 7. Urine samples were collected on Days −5 (control), 8, and 9 for the measurement of urinary pH.

Example 1

No health problems were noted during the course of this 5 day experiment. Urinary pH decreased as a function of dietary inclusion level of adipic acids ($p=0.02$). The results for Day 3 (the last day of full collection) are provided in Fig. 1. Fitting an exponential curve with equation:

$$\text{urine pH} = \text{urine pH without adipic acid} * e^{(-k * \text{adipic acid level})}$$

yielded as value for 'urine pH without adipic acid': 6.4 (note that non-modified pigs have a higher urinary pH), for k: 0.19 ($p=0.02$). This model, although based on very limited numbers of data points, indicated that urinary pH decreased with 1 pH unit when 1 percent adipic acid is added in the diet.

Plasma amino acid results indicated that lysine increased 40% per percent adipic acid in The diet ($p=0.13$, basal lysine level 2.13 mg/dl), while arginine decreased 13% per percent adipic acid in the diet ($p=0.13$, basal level 4.40 mg/dl).

Example 2

During the course of the trial, no treatment-related health problems were noted by the animal care people. The results of this trial are summarized in Table 1. Average daily gain was 7.5% higher (non significant) in the adipic acid fed animals, while feed efficiency was improved 8.3% (not analyzed statistically).

| | control | 1% adipic acid | Improvement |
|---|---|---|---|
| Average daily gain (kg/day) | 0.80 | 0.86 | 7.5% |
| Average daily feed intake (kg/day) | 2.42 | 2.41 | |
| Feed efficiency | 3.03 | 2.80 | 8.3% |
| pH urine | 7.94 | 6.98 | 12% |
| pH manure | 7.92 | 7.64 | 4% |
| plasma lysine (mg/100 g) | 2.64 | 3.57 | 35% |
| plasma arginine (mg/100 g) | 2.22 | 3.12 | 41% |

Urinary pH was 1 pH unit lower ($p=0.12$) in the adipic acid treated group. After mixing the urine with feces, this drop was decreased to only 0.3 pH units difference (not significant). This difference remained stable over a 4 week period.

Plasma lysine increased 35% ($p=0.07$, from 2.64 to 3.57 mg/dl) due to adipic acid supplementation, and arginine increased 41% ($p=0.04$, from 2.18 to 3.12 mg/dl).

Example 3

No adverse health reactions were observed in any of the animals. Urine pH dropped 0.5 pH units ($p=0.01$) due to administration of adipic acid. Plasma arginine concentrations increased 19% ($p=0.04$, from 1.82 to 2.18 mg/dl) upon administration of adipic acid, while plasma lysine increased 24% ($p=0.07$, from 1.36 to 1.68 mg/dl).

Interpretation:

Addition of adipic acid did decrease urinary pH. This decrease is estimated to be approximately 1 pH unit per g adipic acid/(day*$kg^{0.75}$). Such a decrease should lead to a decrease in $NH_3$ in favor of $NH_4^+$ equivalent of 90%, which should correspond to the similar decrease in $NH_3$ volatilization. A decrease in urinary pH is especially interesting since it is the urea in the urine which is most sensitive to degradation to ammonia, thus leading to ammonia emission. A large portion of this emission takes place when urine hits slats or other parts of the animal housing, prior to it entering the manure storage, and it is this portion which is difficult to affect by changing the way manure is being handled in the animal house. In effect, the addition of adipic acid may be a method of reducing ammonia emission which complements other methods oriented towards changing animal housing or reducing the amount of nitrogen entering the animal (low protein diets).

In the manure, obtained after mixing the urine with the feces, a smaller (nonsignificant) drop in pH of approximately 0.3 pH units was measured. Although the latter drop is rather small, it could still have a large impact on ammonia emission if confirmed in a larger trial. In the pH range normally expected in manure, a drop of 0.3 pH units will change the ratio of $NH_3$ to $NH_4^+$ towards $NH_4^+$, decreasing the $NH_3$ concentration with approximately 30%. This decrease should correspond with a decrease in ammonia emission from the manure of approximately the same magnitude. Again, this method of reducing ammonia emission is complementary to improvements in manure handling systems and reductions in the protein level of the diet being fed to the animals.

Plasma lysine concentrations are a function of lysine uptake from the gut, net lysine utilization by tissues, and lysine disposal (through degradation or urinary excretion). In the trials carried out, lysine uptake and net lysine utilization were not negatively affected by treatments, while plasma lysine increased due to treatment. This shows that adipic acid decreased the lysine disposal by inhibiting lysine degradation since urinary excretion of lysine is a minor pathway of disposal in healthy animals. A decrease in lysine degradation due to adipic acid supplementation means that animals which are fed adipic acids require less lysine in the diet.

This lysine requirement-reducing property is of special interest in ruminants. Currently, supplementing ruminants with lysine is difficult since lysine is degraded in the rumen, unless it is protected, often using costly processes. Adipic acid is poorly degraded by micro-organisms. likely because its oxidation requires beta-oxidation enzymes, a pathway which is not prominent in microbes. The adipic acid should thus pass unaffected through the rumen, yielding it available for absorption in the intestines and thus capable of reducing the requirement for lysine. Indeed, plasma lysine increased 24% upon administration of 0.7 g adipic acid/$kg^{0.75}$/day (presuming a linear response, as observed in trial I, this increase in plasma lysine is equivalent to an increase of 34%/(g adipic acid/(day*$kg^{0.75}$)), which is virtually identical to the increase observed in trial 2 in pigs).

The changes in plasma arginine levels observed in trials 2 & 3 prove that plasma arginine increases upon administration of adipic acid. Adipic acid was not expected to directly affect arginine, but indirect effects were anticipated relating to the competition of arginine and lysine for re-absorption at the receptor level in the kidneys, and relating to possible effects of adipic acid on the urea cycle since its urinary excretion as a glycine-conjugate competes with the urea cycle as a pathway of nitrogen disposal. The net effect of adipic acid on these two counteractive mechanisms appears to be an increase in plasma arginine.

The conclusion of these experiments is that adipic acid offers an attractivemean of improving animal performance, provides a complementary method to reduceammonia emission, and serves to reduce lysine and possibly arginine requirements.

I claim:

1. An animal feed comprising adipic acid, beta-hydroxy adipic acid, or beta-keto adipic acid, or an alkali or alkali earth salt or ammonium salt of adipic acid, of beta-hydroxy adipic acid, or of beta-keto adipic acid, wherein the adipic acid, beta-hydroxy adipic acid, or beta-keto adipic acid or the alkali or alkali earth salt or ammonium salt of adipic acid, of beta-hydroxy adipic acid, or of beta-keto adipic acid is present in the animal feed in a ratio of 1 to 10 g/kg of feed.

2. The animal feed according to claim 1 for feeding farm animals, including fish, poultry, pigs, and cattle.

3. A method of reducing the pH of waste from an animal comprising administering to the animal the animal feed according to claim 1.

4. A method of reducing ammonia emission from waste from an animal comprising administering to the animal the animal feed according to claim 1.

5. A method of reducing at least one amino acid requirement of an animal comprising administering to the animal the animal feed of claim 1.

6. The method of claim 5 wherein the amino acid is lysine.

7. The method of claim 5 wherein the amino acid is arginine.

8. A method for controlling at least one undesirable micro-organism in the intestinal tract of an animal comprising administering to the animal the animal feed according to claim 1.

9. An animal feed comprising suberic or sebacic acid, or an alkali or alkali earth salt or ammonium salt of suberic or sebacic acid.

10. A method for reducing the pH of waste from an animal comprising administering to the animal the animal feed according to claim 9.

11. A method for reducing ammonia emission from waste from an animal comprising administering to the animal the animal feed according to claim 9.

12. A method for reducing at least one amino acid requirement of an animal comprising administering to the animal the animal feed of claim 9.

13. The method of claim 12, wherein the amino acid is lysine.

14. The method of claim 12, wherein the amino acid is arginine.

15. A method for controlling at least one undesirable micro-organism in the intestinal tract of an animal comprising administering to the animal the animal feed according to claim 9.

16. The animal feed of claim 9, wherein the suberic or sebacic acid is present in the animal feed in a ratio of 0.01 to 100 g/kg of feed.

17. The animal feed of claim 16, wherein the suberic or sebacic acid is present in the animal feed in a ratio of 1 to 10 g/kg of feed.

18. An animal feed comprising an aliphatic dicarboxylic acid or an aliphatic dicarboxylic acid metabolite, or an alkali or alkali earth salt or ammonium salt of the aliphatic dicarboxylic acid or aliphatic dicarboxylic acid metabolite, wherein the aliphatic dicarboxylic acid or aliphatic dicarboxylic acid metabolite or the alkali or alkali earth salt or ammonium salt of the aliphatic dicarboxylic acid or aliphatic dicarboxylic acid metabolite is present in the animal feed in a ratio of 1 to 10 g/kg of feed, and wherein the aliphatic dicarboxylic acid or aliphatic dicarboxylic acid metabolite or the alkali or alkali earth salt or ammonium salt of aliphatic dicarboxylic acid or aliphatic dicarboxylic acid metabolite contains 6 to 10 carbon atoms.

19. A method for nourishing an animal with adipic acid, beta-hydroxy adipic acid, or beta-keto adipic acid, or an alkali or alkali earth salt or ammonium salt of adipic acid, of beta-hydroxy adipic acid, or of beta-keto adipic acid, which comprises administering to the animal the animal feed of claim 1, wherein the adipic acid, beta-hydroxy adipic acid, or beta-keto adipic acid, or the alkali or alkali earth salt or ammonium salt of adipic acid, of beta-hydroxy adipic acid, or of beta-keto adipic acid increases the weight of the animal.

20. A method for nourishing an animal with suberic or sebacic acid, or an alkali or alkali earth salt or ammonium salt of suberic or sebacic acid, which comprises administering to the animal the animal feed of claim 9, wherein the suberic or sebacic acid, or the alkali or alkali earth salt or ammonium salt of suberic or sebacic acid increases the weight of the animal.

* * * * *